(No Model.)
K. P. ALSTON, Jr., & J. M. BASKET.
SEEDING MACHINE.
No. 370,301. Patented Sept. 20, 1887.
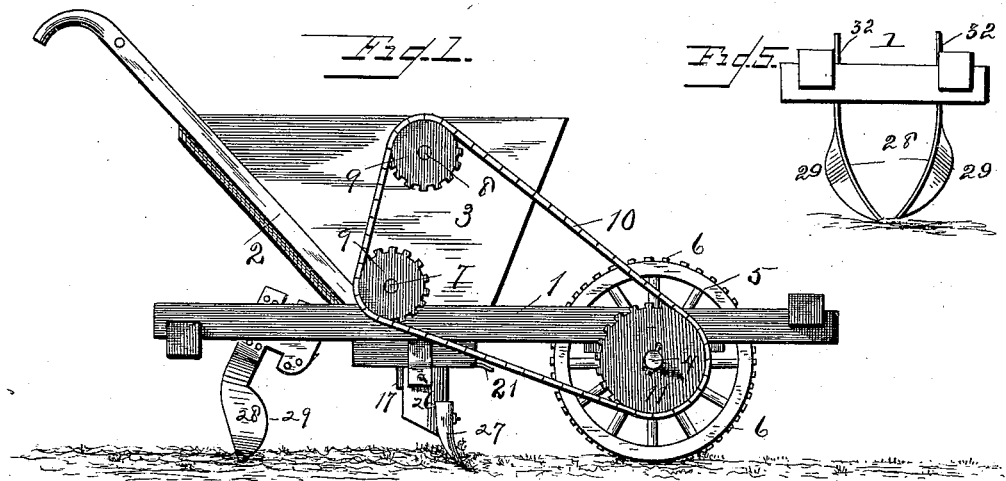
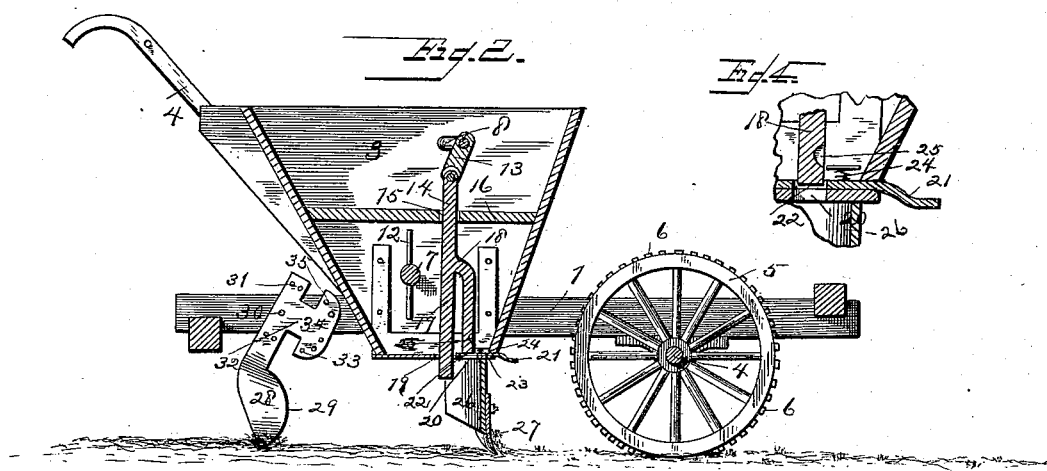
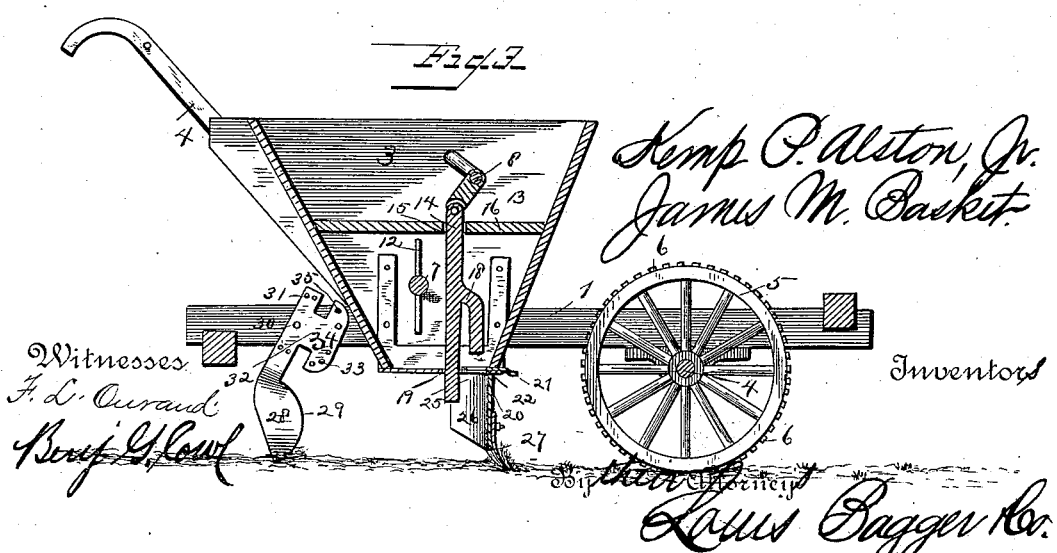

UNITED STATES PATENT OFFICE.

KEMP P. ALSTON, JR., OF LEXINGTON, KENTUCKY, AND JAMES M. BASKET, OF LEOTA LANDING, MISSISSIPPI.

SEEDING-MACHINE.

SPECIFICATION forming part of Letters Patent No. 370,301, dated September 20, 1887.

Application filed January 22, 1887. Serial No. 225,074. (No model.)

*To all whom it may concern:*

Be it known that we, KEMP P. ALSTON, Jr., of Lexington, in the county of Fayette and State of Kentucky, and JAMES M. BASKET, of Leota Landing, in the county of Washington and State of Mississippi, have invented certain new and useful Improvements in Seeding-Machines; and we do hereby declare that the following is a full, clear, and exact description of the invention, which will enable others skilled in the art to which it appertains to make and use the same, reference being had to the accompanying drawings, which form a part of this specification, and in which—

Figure 1 is a side view of our improved seeding-machine. Fig. 2 is a longitudinal vertical sectional view of the same. Fig. 3 is a similar view showing the machine adjusted for planting cotton or similar seed. Fig. 4 is an enlarged detail view of a portion of the seed plunger and slide, and Fig. 5 is a rear view of the coverers.

Similar numerals of reference indicate corresponding parts in all the figures.

Our invention has relation to that class of seeding-machines in which a vertically-reciprocating plunger forces the seed down through the bottom of the seed-box; and it consists in the improved construction and combination of parts of such a machine which may be used for planting corn or similar seed and may be changed to plant cotton or similar seed, as hereinafter more fully described and claimed.

In the accompanying drawings, the numeral 1 indicates the rectangular frame, to the rear portion of which the handles 2 are secured, having the seed-box 3 secured between them, and the drive-axle 4, carrying the drive-wheel 5, is journaled in the forward end of the frame. This drive-wheel is preferably cast with spokes and with projections 6 upon its rim for biting in the soil and preventing the wheel from slipping. The seed-box has a shaft, 7, journaled in its lower portion and a crank-shaft, 8, journaled in its upper portion, and the ends of these shafts are provided with pulleys 9 or sprocket-wheels, over which passes a sprocket-chain, 10, which passes over a wheel, 11, upon the drive-axle.

The lower shaft in the seed-box is provided with radiating stirrer-arms 12, and the crank upon the upper shaft has a connecting-rod, 13, pivoted to it, the lower end of which connecting-rod or pitman is pivoted to the upper end of a vertical plunger, 14, sliding in a vertical bearing, 15, in a horizontal bar, 16, in the seed-box.

The lower end of the plunger is formed with a guide portion, 17, forming a continuation of the upper portion of the plunger, and with a portion, 18, forming the plunger proper, both of these portions sliding in apertures 19 and 20 in the bottom of the seed-box.

The aperture for the plunger portion is provided with a sliding plate, 21, having an aperture, 22, fitting to the plunger, and the forward edge of this aperture has a plate or scraper, 23, secured to its under side with a spring, 24, which plate bears against the forward side of the plunger, which is formed with a seed-cup, 25, in that side, so that the spring-cushioned plate may scrape the surplus seed from the plunger and retain them in the seed-box, while it will not crush or break any of the seed.

A seed-tube, 26, open at its rear side, is pivoted to the bottom of the seed-box around the seed-aperture in the same, and the lower end of this tube is provided with an opening-shovel, 27, which serves to open the soil for receiving the seed.

Covering-blades 28, having curved forward edges, 29, and being bulged outward at their middles, bringing their points inward, are pivoted with the upper ends of their shanks upon bolts 30 to the inner sides of the sills forming the frame, and the upper ends of the shanks or standards of these covering-blades are formed with forwardly-projecting arms 31, the ends of which are provided with segmental cross-heads 32, having segmental series of perforations 33, through which bolts 34 are inserted into perforations 35, registering with the series of perforations, so that the covering-blades may be set at different angles to the sills of the frame.

When the machine is to be used for planting cotton, the plunger portion is shorter than the plunger portion having the cup, and the plate having the spring-cushioned plate or scraper is replaced by a plate having a plain aperture, as shown in Fig. 3 of the drawings.

It will be seen that when the machine is used for planting corn or similar seed the plunger will be reciprocated as the machine travels over the field, and the cup will be filled on its upstroke and be emptied on the downstroke after passing through the plate, planting the seed in hills.

When the shorter plunger portion is used in planting cotton, the plunger portion will simply force a quantity of seed through the aperture in the bottom of the seed-box, the seed being stirred up by means of the revolving stirrer-shaft and its arms.

The distance between the hills in which the seed is planted may be governed by the size of the wheels upon the shafts in the seed-box and the wheel upon the drive-axle.

Having thus described our invention, we claim and desire to secure by Letters Patent of the United States—

1. In a seeding-machine, the combination of a seed-box having two apertures in its bottom and having a vertical bearing in a bar in the upper part of the box registering with the rearmost aperture, a crank-shaft journaled transversely in the upper portion of the seed-box, and a plunger having a straight portion sliding in the bearing and in the rear aperture, and having a plunger portion projecting parallel to the straight portion and registering with the forward aperture, and having a pitman pivoted to the upper end and to the crank, as and for the purpose shown and set forth.

2. In a seeding-machine, the combination of a seed-box having two apertures in its bottom, a slide or plate in the bottom of the seed-box, having an aperture registering with the forward aperture in the bottom and provided with a spring-cushioned plate, and a vertically-reciprocating plunger having a guide portion sliding in the rear perforation, and having a plunger portion parallel to the guide portion and formed with a seed-cup in its forward side and sliding in the forward aperture, as and for the purpose shown and set forth.

3. In a seeding-machine, the combination of a seed-box having two apertures in its bottom and having a vertical bearing in its upper portion registering with the rear aperture, a shaft journaled in the upper portion of the seed-box and formed with a crank and provided with a pulley upon one end, a plunger having a pitman pivoted to the crank and having a guide portion sliding in the rear perforation and a parallel plunger portion reciprocating in the forward aperture and formed with a seed-cup in its forward side, a shaft journaled in the lower portion of the seed-box and having radiating stirrer-arms and a pulley upon its end, and a drive-wheel having a pulley upon its shaft, and a chain passing over the pulley upon its axle and over the pulleys upon the shafts in the box, as and for the purpose shown and set forth.

4. In a seeding-machine, the combination, with a frame having two parallel sills and a suitable seed-tube formed with an opening-shovel, of two covering-blades having bulged lower portions formed with curved forward edges and having their standards pivoted upon the sills and formed with forwardly-projecting arms having segmental cross-pieces at their ends formed with segmental series of perforations, and bolts passing through the said perforations and into perforations in the sills, as and for the purpose shown and set forth.

In testimony that we claim the foregoing as our own we have hereunto affixed our signatures in presence of two witnesses.

KEMP P. ALSTON, JR.
JAMES M. BASKET.

Witnesses to Alston's signature:
D. W. STANDEFORD,
GEORGE B. HIGGINS.
Witnesses to Basket's signature:
A. R. BATTEY,
J. M. WHITWORTH.